United States Patent [19]
Blauer et al.

[11] 3,937,283
[45] Feb. 10, 1976

[54] FORMATION FRACTURING WITH STABLE FOAM

[75] Inventors: Roland E. Blauer, Golden; Clarence J. Durborow, Englewood, both of Colo.

[73] Assignees: The Dow Chemical Company, Midland, Mich.; Minerals Management, Inc., Denver, Colo.

[22] Filed: Oct. 17, 1974

[21] Appl. No.: 515,557

[52] U.S. Cl............. 166/307; 166/308; 252/8.55 R
[51] Int. Cl.²..................... E21B 43/26; E21B 43/27
[58] Field of Search................... 166/280, 307, 308; 252/8.55 R, 8.55 C

[56] References Cited
UNITED STATES PATENTS

| | | | |
|---|---|---|---|
| 3,100,528 | 8/1963 | Plummer et al.............. | 166/244 R |
| 3,136,361 | 6/1964 | Marx................... | 166/308 |
| 3,245,470 | 4/1966 | Henry................... | 166/280 |
| 3,323,593 | 6/1967 | Foshee et al............... | 166/282 |

*Primary Examiner*—James A. Leppink
*Attorney, Agent, or Firm*—Head & Johnson

[57] ABSTRACT

Stable foam within specified quality range is used as a fracturing fluid or to extend fractures in subterranean formations.

20 Claims, 4 Drawing Figures

FORMATION FRACTURING WITH STABLE FOAM

BACKGROUND

The hydraulic fracturing of subterranean formations is now a well known concept for improving the productivity of subterranean hydrocarbon formations. In the usual process various liquids, such as crude oil, diesel fuel, kerosene, water, etc., with or without propping agents, such as sand suspended therein, have been applied under pressure to subterranean formations. By increasing the pressure upon the hydraulic liquid the formation is placed under stress so as to break-down or part or 'fracture.' Such fracturing, however, has its limitations in that very often the liquid utilized is highly viscous requiring large and multiple pumping equipment to achieve high injection rates and pressures to reach the 'formation break-down pressure' and to extend the fracture. Generally, when formation break-down pressure is reached and fracturing occurs, a large pressure drop results. The pumps then must be capable of rapidly supplying large volumes of additional fracturing liquid in order to maintain and extend the fractures formed. In addition, the use of such liquids often requires additional treatment or chemicals to increase viscosity and/or gel strength and/or to improve fluid loss properties of the hydraulic liquids to the formation and/or improve the sand and propping agent carrying capabilities and/or other reasons. However, under present times it has become important to conserve such liquids as crude oil heretofore utilized in the fracturing processes and find other medium to achieve the fracturing or more importantly the extension of existing fractures in subterranean formation. Further, the disposal of large quantities of fracturing fluids or the additives therein will damage the environment i.e., air, land or water and is undesirable.

Low permeability gas wells are particularly sensitive to the injection of hydraulic fracturing liquids and the additives therein which have tendency to plug the gas pores of a formation and instead of increasing will greatly hinder or cease the production therefrom. In many instances it is necessary to complete the well by swabbing or other operation in order to return the fracture fluid and to initiate production.

Others have taught the use of aerated well treatment compositions, but have not described a stable foam having the quality standards nor have they described the process to achieve the quality fracturing or fracture extension fluids as set forth in this invention. See for example:

U.S. Pat. No. 3,100,528 — Plummer et al., teach the need of a gas cushion injector prior to injection of an aerated well treating reactant. The gas injection rates taught are insufficient to maintain and create a foam of quality defined herein.

U.S. Pat. No. 3,136,361 — Marx, which teaches prefracture with compressed gas followed by injection of aerated liquid to extend the fracture. The liquid is treated to achieve the necessary characteristics desired for fracture extension.

U.S. Pat. No. 3,245,470 — Henry, which is a multi-hydraulic fracturing process wherein an aerated liquid is injected to plug preformed fractures followed by additional hydraulic fracturing.

U.S. Pat. No. 3,323,593 — Foshee et al., teach a liquid fracturing base formed of two normally immiscible liquids (principal and conditioning), a surfactant, and a gas in an amount in excess of that which will dissolve in the liquid at the formation temperature and pressure.

SUMMARY OF THE INVENTION

This invention is distinguishable over these and other known prior artisans by the discovery of required stable foam quality (i.e., gas-liquid ratio) as a fracturing and/or fracture extending fluid as defined herein. More particularly, this invention has found that gas-liquid ratios within certain specified quality range, as defined herein, is sufficient to achieve desirable fracture fluid and fracture extending properties. This occurs without other additives as heretofore taught in the art. This desired quality is maintained at the temperature and pressure conditions that exist during the process of fracturing or extending a fracture.

Accordingly, it is an object of this invention to provide a fluid composition of matter and a process for using that composition to fracture, extend an existing fracture, or otherwise stimulate flow, drainage and productivity of subterranean hydrocarbon, water or inorganic gas ($CO_2$ or $N_2$) formations.

To accomplish the above and other objects, this invention relates to a stable foam fluid broadly comprising a liquid base, a gas and usually a surface active agent to create a stable foam having a Mitchell quality, as herein defined, in the range of between 0.5236 to 0.9999 and preferably within the range of 0.60 to 0.85 at the temperature and pressure conditions existing during treatment of the formation encountered. The desired Mitchell quality will depend upon the condition of the well, permeability, porosity, temperature, pressure and other practices that are evident to a man skilled in the art that exist during treatment of the formation.

Such a fracturing or fracture extending fluid as described herein has all of the desirable properties for such treatment, to wit:

1. Reduced possibilities of fluid production blockage of formation pores, i.e., oil, water or gas block;
2. Usually no need of special chemicals, e.g. gels or emulsions, which require either time or other means to break before production can begin;
3. Excellent propping agent (e.g. sand) carrying capacity and minimal settling for better placement during treatment and during periods of shut down.
4. Minimal injection horsepower pumping energy requirements because of low friction losses and low liquid injection rates.
5. Reduction in clean out time after fracture extension as there is less liquid to recover and there is usually sufficient energy within the compressed gas in the foam to return the liquid to the well bore.
6. Low fluid loss to the formation during the fracture or fracture extending process.
7. Reduced hydrostatic head of fluid existing in the well casing and thus allow natural formation pressure to assist clean-out, and
8. Reduced need for liquid base material and its usual storage and transporting costs.

DETAILED DESCRIPTION

Before explaining the present invention in detail, it is to be understood that the invention is not limited in its application to the details of construction and arrangement of the material illustrated in the accompanying drawings, since the invention is capable of other embodiments and of being practiced or carried out in various ways. Also, it is to be understood that the phraseology or terminology employed herein is for the purpose of description and not of limitation unless otherwise stated.

Foam Quality

Foam quality for the purposes of this invention is considered to be the ratio of gas volume to the total foam volume:

$$\Gamma\, tp = \frac{V_{sg}}{V_f}$$

Where:

$\Gamma\, tp$ = foam quality at a specified temperature and pressure and referred to herein as the "Mitchell quality."

$V_{sg}$ = volume of saturated gas (excludes gas in solution, if any)

$V_f$ = volume of foam

This definition coincides with that disclosed and utilized in paper No. SPE 4885 entitled "Determination of Laminar, Turbulence and Transitional Foam Flow Losses in Pipes," by R. E. Blauer, B. J. Mitchell and C. A. Kohlhass, presented before the 44th annual California regional meeting of the Society of Petroleum Engineers of AIME in San Francisco, Calif., Apr. 4–5, 1974. Also utilized in paper No. SPE 5003 entitled "Formation Fracturing With Foam," by R. E. Blauer and C. A. Kohlhass, before the 49th annual fall meeting of the Society of Petroleum Engineers of AIME held in Houston, Tex., Oct. 6–9, 1974. These papers are incorporated herein by reference.

Figure 1:
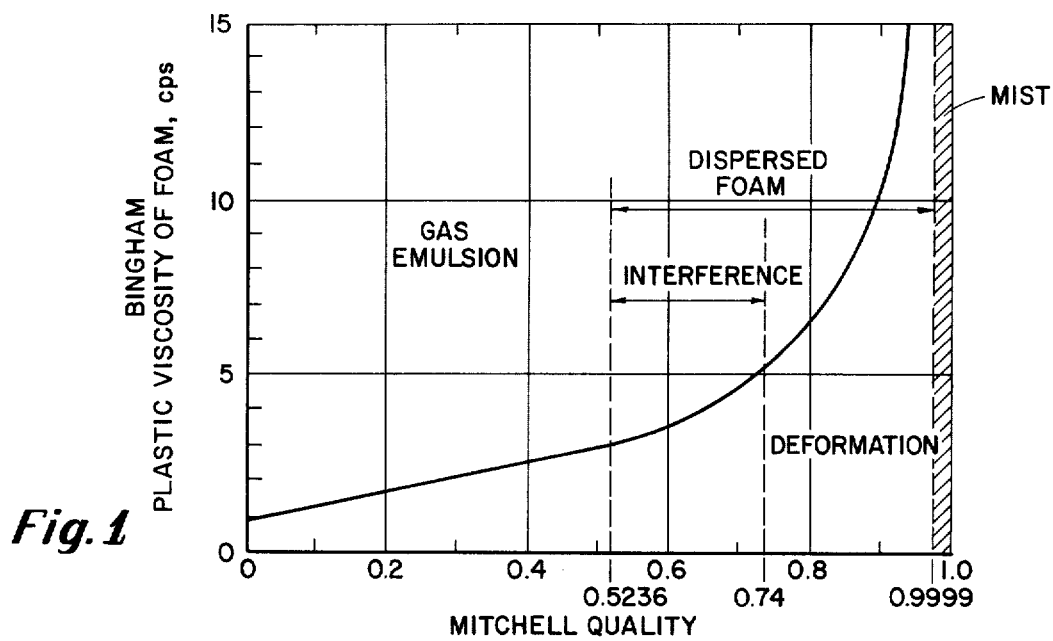
FIG. 1 is a graph derived by B. J. Mitchell and depicting Bingham plastic viscosity relative to foam quality.
Figure 2:
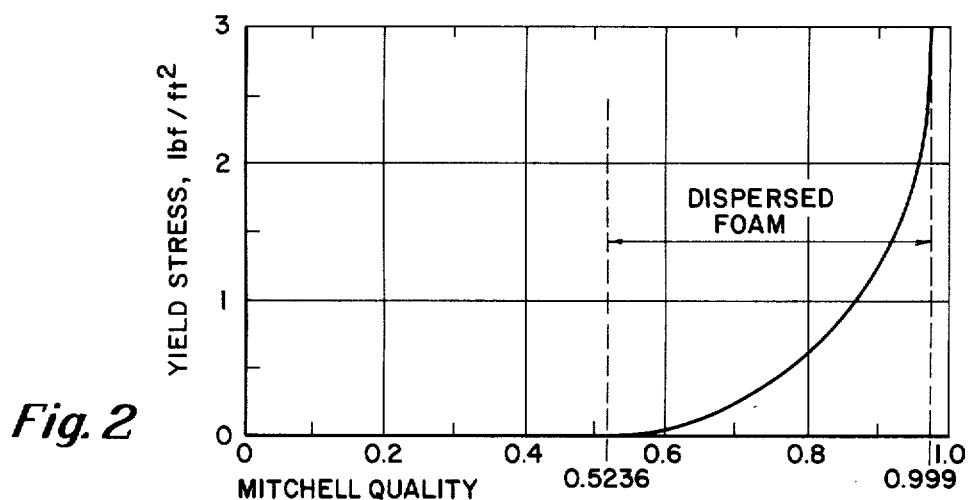
FIG. 2 is a graph also derived by Mitchell and depicting yield stress relative to foam quality.

FIG. 1 shown herein was developed from the theories of Einstein and Hatschek and laboratory measurements by Mitchell and is described in paper SPE 4885, supra. Blauer and Mitchell showed that the foam with Mitchell qualities between 0.5236 and 0.9999 behaves as a Bingham plastic fluid. FIG. 2 shows this. That is, the rheological properties of the foam changes above Mitchell quality of 0.5236. It has been found that a foam fracturing and fracture extending fluid, at treating temperature and pressure, having a Mitchell quality $\Gamma\, tp$ within the range of 0.5236 to 0.999 (preferably 0.60 to 0.85) is a satisfactory composition especially in formations having permeability less than 5 millidarcies (md).

The Foam

Generally, foams are dispersions of a relatively large volume of gas in a relatively small volume of liquid. When the volume of liquid is considerably greater than that of gas, the gas bubbles are, as a rule, spherical and their mutual interaction is weak. These systems are known as "gas emulsions." In a true foam, the bubbles are so crowded that their shape is deformed, usually polyhedral. This shape change occurs at a foam quality of 0.5236 if the foam is flowing. If the foam is static deformation occurs at 0.740 quality. It is this deformation characteristic that provides a rigidity and increase surface energy, i.e., requires external work, that is found to be useful in this invention.

The foam as used herein for a fracturing and/or fracture extending fluid herein is generally a dispersion of gas, typically nitrogen and a small amount of surfactant foaming agent within a liquid base material. Specifically, the foam materials are dispersed together in such a manner as to create a foam having a Mitchell quality range as herein defined between 0.5236 to 0.9999 and preferably 0.60 to 0.85. That is, the foam is a homogenous mixture with a uniform bubble size and is stable for several hours.

Examples of the liquid base material within the scope of this invention include water, brines, acid, crude or refined oil, hydrocarbon condensates, etc.

The gas utilizable within the invention includes nitrogen, carbon dioxide, air, hydrocarbon gases, including normally gaseous and normally liquid hydrocarbon gases and the so-called "inert" gases, such as argon, helium, krypton and xenon.

The surface active foaming agent utilized will, of course, depend upon the liquid base and the type and character of the formation, and is to include anionic, cationic, nonionic materials or mixtures thereof. Those soap-like agents having molecules containing a long paraffin chain with a hydrophillic end group are preferred. Surfactant content is typically 0.5 to 1 percent of the liquid base volume. Examples include polyethylene glycol ethers of alkylated phenol, sodium dodecyl sulfate, sodium dodecane sulfonate and trimethyl hexadecyl ammonium bromide.

In some instances other formation treating agents may be included. These are clay swelling inhibitors (e.g. KCl) clay sequestering agents (e.g. hydroxy alumina) iron chelating agents, acids (HCl, HF, Acetic) non-emulsifying agents, gels, or active gaseous materials such as $CO_2$, $Cl_2$, $O_2$.

Proppants used herein include graded sand, river sand, glass beads, aluminum pellets, walnut shells and are within the range of 0.25 to 15/lbs per gallon of liquid.

For purposes herein, Mitchell quality foam used for fracturing and/or extending existing fractures shall include the volumes of all constituents, liquid and gaseous to achieve the desired range.

Foam Creation and Fracture Process

Figure 3:
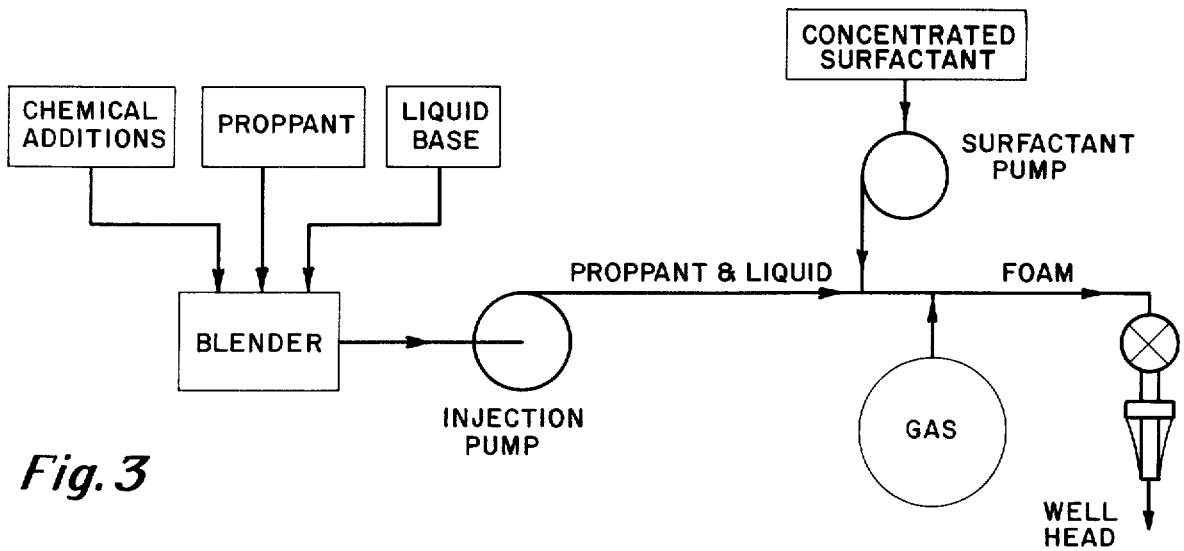
FIG. 3 is a schematic diagram of the process for creating and injecting foam into a well.

The process of creating and using the foam of Mitchell quality described herein is schematically depicted in FIG. 3.

During a treatment operation, the liquid phase passes through a blender and is mixed with proppant and other additives if needed. This slurry is pumped by an injection pump which raises the pressure to required well head pressure. Surfactant foaming agent is usually added downstream of the injection pump. Gas is introduced through a tee downstream from the surfactant. Foam is generated at the point of gas introduction by the process of dispersion. The injection rates of liquid-gas and additives must be such that the desired Mitchell quality is achieved, at the formation being treated. That is, during the treatment process the Mitchell quality at the well head may very well be outside of the desired range of 0.5236 to 0.9999, so long as it is within the range opposite the formation. This is best described by reference to the example herein and FIG. 4.

The gas may be transported to the site and stored in cyrogenic tanks and added to the injection stream at line pressure.

When the fracture is to be initially created, injection of the foam continues and pressure increased until formation break-down at which time injection is continued or increased as desired to extend the fracture and inject additional fracture extending fluid and propping agent. If multiple fracturing is desirable, a temporary plugging agent is injected to seal the existing fracture and the foam process is repeated as desired. After pumping is completed clean-out operations began.

Design Procedure

Because small changes of pressure cause large changes of volume of the gaseous phase, foam flow velocity, density, quality, and viscosity all change markedly during a treatment and are quite sensitive to pressure. Pressure at all points in the treatment from pumps to fracture tip must be carefully estimated so velocities, densities, qualities, and viscosities can be determined for each portion of the flow system. With this basic consideration the following procedure has been used for treatment design:

1. Estimate bottom-hole pressure necessary to fracture the formation and propagate the fracture.
2. Assume a fracture width and height which will be opened during injection.
3. Arbitrarily select a bottom-hole foam quality and injection rate in the fracture.
4. Determine the fluid-loss coefficient and viscosity for the foam at bottom-hole conditions from the laboratory data with the assumed fracture geometry and fracture pressure.
5. Calculate the fracture geometry resulting from the treatment: height, width, and area.
6. If the fracture geometry is acceptable, go to step 7; if not, assume another quality or rate and repeat steps 1 through 5 until an acceptable geometry results.
7. Determine pressure drop through the perforations:

$$\Delta P_{perf} = \frac{P_f q_p^2}{8090 \, A_p^2} \quad (17)$$

8. Estimate foam quality, e.g., by mass balance techniques, velocity, density, and viscosity at the bottom of the well-bore inside the pipe. These values will be the same as in steps 3 and 4 if $\Delta P_{perf}$ is small.
9. Divide the fluid conduit, tubing or casing, into segments. Calculate the pressure difference during the treatment for each segment. Make necessary corrections to velocities, viscosities, densities, and qualities and repeat the calculations until changes become negligible.
10. Repeat step 9 for each segment until wellhead conditions are determined: foam quality, injection pressure, and surface injection rate.
11. If calculated surface conditions are not acceptable, begin again with step 3 and new assumptions regarding bottom-hole quality and injection rate.

Due to the sensitivity of foam properties to changes of pressure, rate, and other operating conditions, small changes of operating conditions may cause significant changes of treatment behavior and results. Treatment efficiencies may be altered markedly by seemingly negligible variations of operating technique, conditions, equipment, and behavior. For this reason treatments must be closely monitored and supervised, and any alterations from design conditions must be quickly analyzed in the field during treatment and necessary modifications to procedure or conditions instituted quickly. Experience has shown treatment conditions can be analyzed such that surface pressure can be predicted within 5 percent of measured surface pressure.

Actual field case histories are reported in the paper No. SPE 5003, Table 4, supra. The following examples are illustrative of the practice of this invention and to show the criticality of the foam quality.

EXAMPLE NO. 1

A treatment was conducted on a gas well in Montana. The Bowdoin formation at 1075 feet is a silty sandstone of permeability less than 0.5 md. Bottom-hole treating pressure was 1,000 psi and a temperature of 80° F. The well was initially fractured using 28,100 gal. of 0.80 Mitchell quality foam injected at a rate of 20 barrels per minute (bpm). The foam was created using 134 bbls of water at 4 bpm and 197,300 scf of nitrogen at 5,870 scfm. 10,000 lbs. of 20/40 sand was the proppant. The water included 135 lbs. of KCl and 61 gal. of surfactant, Haliburton Halco-Suds. After fracture break-down and pumping stopped, clean-out took about 14 hours. Initial production was 250 mcfd at 50 psi while six months later production was 197 mcfd at 50 psi. Offset well production is 10–20 mcfd.

EXAMPLE NO. 2

Figure 4:
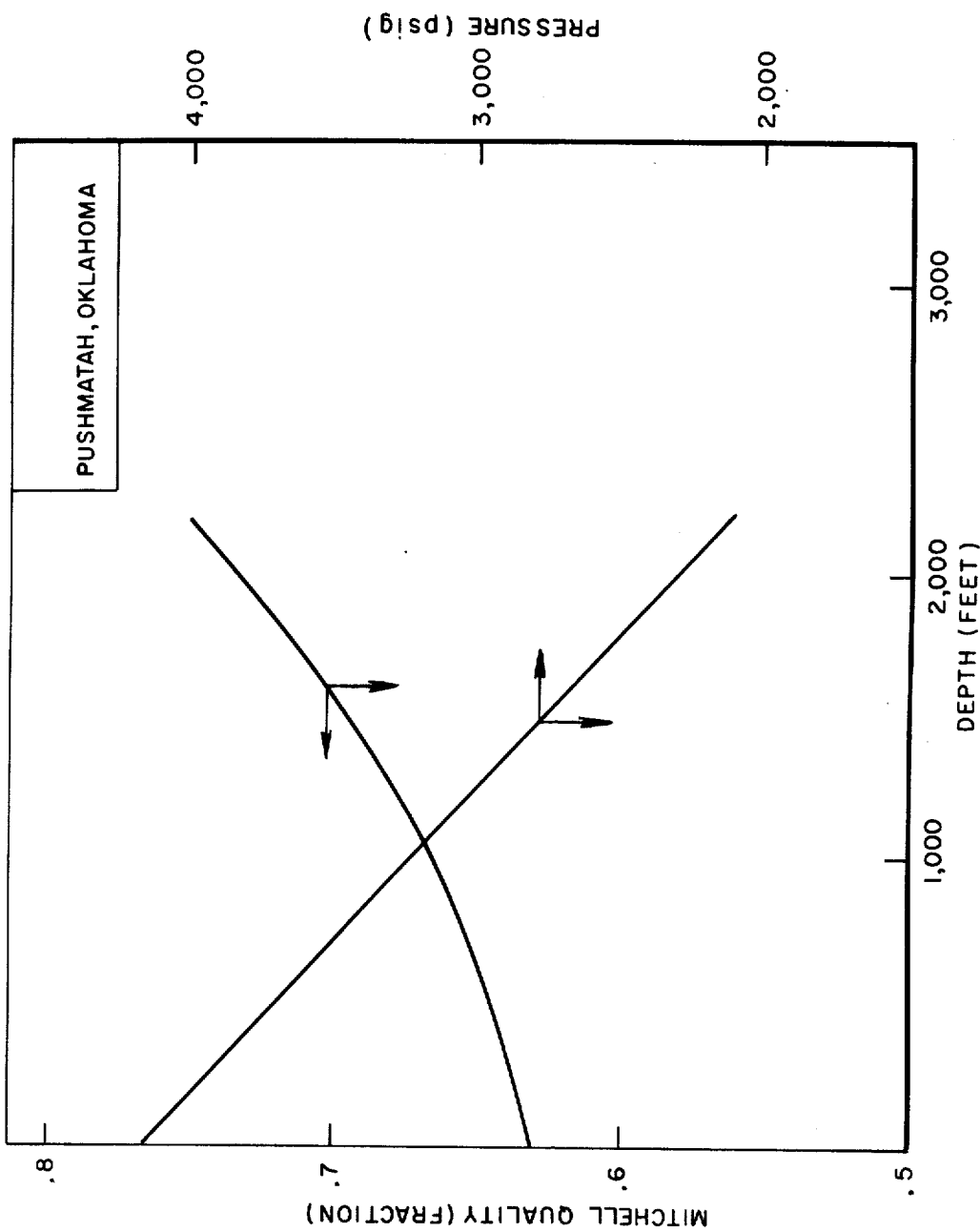
FIG. 4 is a chart used in the Example No. 2 herein.

An initial fracture treatment was performed on a well in Pushmataha, Okla., in the Stanley shale formation at 2,100 feet. The shale zone exists from 800 feet to 5,000 feet in thickness. Other zones had been previously treated by conventional means with no results. Likewise, five other offset wells had been treated without results. A foam fracturing process in accordance with the invention was performed, utilizing 41,000 gal. of 0.75 Mitchell quality foam injected at 24.7 bpm using 245 bbl. of water injected at 6.2 bpm and 957,000 scf of nitrogen injected at 15,000 scfm. The water had been treated with 3% KCl and 10 gal. of Dowell F-52 surfactant per 1,000 gal. of water. 40,000 lbs. of 20/40 mesh sand was used as proppant. After clean-out the well produced 200 mcfd of gas. Other wells in the area had shown some production after perforating and before fracturing. This well had no production after perforation. In the other wells all production was lost after fracturing. The graph of FIG. 4 is typical of that used in this example to allow the operator to monitor the foam quality. That is, the graph will show the Mitchell quality foam desired at the formation under treatment conditions, and what Mitchell quality foam will be at the well head to achieve that desired Mitchell quality.

EXAMPLE NO. 3

A fracture extension treatment occured on a well located in Sutton County, Texas. The well had been fractured with acid the day before and swabbed, providing a trace of production from the Canyon sand formation at 5,700 ft., which has a permeability between 0.1 and 10 md. The fracture extension treatment using foam was designed originally for a 0.70 Mitchell quality foam. However, because of problems with the nitrogen truck, a 0.65 Mitchell quality foam was utilized having 28,600 gal. injected at 14.8 bpm using 244 bbl. of water treated with 2% KCl and ½% $CaCl_2$ and 3 gal. per thousand gal. of water of Adofoam BF-1 surfactant. The water was injected at the rate of 5.2 bpm and 570,000 scf of nitrogen was dispersed therein at 12,566 scfm. 35,000 lbs. of 20/40 mesh sand was used as a propping agent. The average treating pressure was 4,200 psi with the maximum at 4,600 psi. The instantaneous shut-in pressure was 3,500 psi. Because one of the nitrogen trucks completely ceased operation the nitrogen rate was lost and foam quality depreciated to about 0.44. As soon as the lower quality ratio began, the sand screened out. Well clean-out operations then occurred without any mechanical swabbing operations in about 7 hours, but only a small portion of the injected foam material was recovered, which is believed to have been due to the lower quality foam that occurred during the operation.

EXAMPLE NO. 4

An off-shore gas well located in Lake Erie, Ontario, Canada, 2,000 ft. deep is of 50 md permeability and a very water sensitive formation. An initial fracture treatment using the foam defined in the invention occurred with 61,000 gal. of 0.60 Mitchell quality foam at 31.8 bpm using 580 bbl. of water treated with 2% $CaCl_2$ and 3 gal. per thousand of Halco-Suds surfactant at 12.7 bpm at 570,000 standard cubic ft. of nitrogen at 12,900 scfm. 80,000 lbs. of sand were used as propping agent. The well was put on a floating manifold for clean-out operations. Approximately 200 bbl. of liquid were recovered prior to placing on the floating manifold. The well had previously shown production of 222 mcfd gas on a drill stem test. After foam fracturing as above described the well produced 600 mcfd giving a production increase of 2.9.

EXAMPLE NO. 5

A total of 20 wells, similar to Example No. 4, were fractured utilizing the foam defined in this invention in the same field. The average production increase for such fracturing operation was 3.35. Fifty other wells in the same field, which had been treated with conventional fracturing operation produced an average production increase of 1.94. The productivity increases were computed by the operating company of the wells.

What is claimed:

1. A method of extending an initially fractured subterranean formation penetrated by a well bore with a stable foam, said foam comprising a mixed dispersion of a liquid base, a surfactant, a propping agent and a gas such that the Mitchell quality of said foam at the temperature and fracture extension pressure of the formation, as derived from the formula:

$$\Gamma\ tp = \frac{V_{su}}{V_f}$$

where $\Gamma\ tp$ = the Mitchell derived quality
$V_{su}$ = the volume of saturated gas (excluding gas in solution if any)
$V_f$ = the volume of foam is between the range of 0.5236 to 0.9999;
injecting said foam into said well bore and increasing the pressure of said foam against said formation to reopen and/or extend said initial fracture of said formation.

2. A method in accord with claim 1 wherein said liquid base is oil.
3. A method in accord with claim 1 wherein said liquid base is water.
4. A method in accord with claim 1 wherein said liquid base is an acid.
5. A method in accord with claim 1 wherein said gas is from the group consisting of air, nitrogen, carbon dioxide, normally gaseous and normally liquid hydrocarbon gases.
6. A method of claim 1 wherein said foam includes a formation treating agent and is still within said Mitchell quality.
7. A method of claim 6 wherein said formation treating composition is a clay swelling inhibitor.
8. A method of claim 6 wherein said composition is an acid capable of reacting with said formation.
9. A stable foam composition for fracturing subterranean hydrocarbon bearing formation comprising, a mixed dispersion of a liquid base, a surfactant, a propping agent and a gas such that the Mitchell quality of said foam at the temperatures and break-down pressures of the formation as derived from the formula:

$$\Gamma\ tp = \frac{V_{su}}{V_f}$$

where $\Gamma\ tp$ = the Mitchell derived quality
$V_{su}$ = the volume of saturated gas (excluding gas in solution if any)
$V_f$ = the volume of foam is between the range of 0.5236 to 0.9999.

10. The composition of claim 9 wherein said liquid base is oil.
11. The composition of claim 9 wherein said liquid base is water.
12. The composition of claim 9 wherein said gas is from the group consisting of air, nitrogen, carbon dioxide, normally gaseous and normally liquid hydrocarbon gases.
13. A method of initially fracturing a subterranean formation penetrated by a well bore within a stable foam, said foam comprising a mixed dispersion of a liquid base, a surfactant, a propping agent and a gas such that the Mitchell quality of said foam at the temperature and pressures of the formation at the time of treatment as derived from the formula:

$$\Gamma\ tp = \frac{V_{su}}{V_f}$$

where $\Gamma\ tp$ = the Mitchell derived quality
$V_{su}$ = the volume of saturated gas (excluding gas in solution if any)
$V_f$ = the volume of foam is between the range of 0.5236 to 0.9999;
injecting said foam into said well bore and increasing the pressure of said foam against said formation until break-down and fracture of said formation.

14. A method in accord with claim 13 wherein said liquid base is oil.
15. A method in accord with claim 13 wherein said liquid base is water.

16. A method in accord with claim 13 wherein said liquid base is an acid.

17. A method in accord with claim 13 wherein said gas is from the group consisting of air, nitrogen, carbon dioxide, normally gaseous and normally liquid hydrocarbon gases.

18. A method of claim 13 wherein said foam includes a formation treating agent and is still within said Mitchell quality.

19. A method of claim 18 wherein said formation treating composition is a clay swelling inhibitor.

20. A method of claim 18 wherein said composition is an acid capable of reacting with said formation.

* * * * *